United States Patent
Shio et al.

(10) Patent No.: US 6,539,037 B1
(45) Date of Patent: Mar. 25, 2003

(54) LASER APPARATUS

(75) Inventors: Koji Shio, Hiratsuka (JP); Osamu Wakabayashi, Hiratsuka (JP); Toru Suzuki, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 145 days.

(21) Appl. No.: 09/630,366

(22) Filed: Aug. 1, 2000

(51) Int. Cl.⁷ .................................................. H01S 3/13
(52) U.S. Cl. ................. 372/29.02; 372/32; 372/29.014; 372/92; 372/98; 372/18; 372/20
(58) Field of Search .............................. 372/18, 20, 98, 372/92, 29.02, 32, 29.014

(56) References Cited

FOREIGN PATENT DOCUMENTS

| JP | 3238329 | 10/1991 |
| JP | 5095154 | 4/1993 |
| JP | 2631553 | 4/1997 |

Primary Examiner—Leon Scott, Jr.
(74) Attorney, Agent, or Firm—Stevens, Davis, Miller & Mosher, LLP

(57) ABSTRACT

A laser apparatus has a function to easily select a component having a wavelength near to an oscillated wavelength of a laser beam from among components of a reference beam having a spectral distribution, which is already known, as a reference in measurement of the oscillated wavelength of the laser beam. The laser apparatus has a laser oscillator for outputting a laser beam, a reference light source for outputting a reference beam having a spectral distribution which is already known, two spectrum separation units having different resolving power, a detecting device for detecting a part of the laser beam and a part of the reference beam separated by the two spectrum separation units, and a control unit for measuring an oscillated wavelength of the detected laser beam by using as a reference a component selected from among components of the detected reference beam and having a wavelength near to the oscillated wavelength of the detected laser beam. According to the laser apparatus, the component having the wavelength near to the oscillated wavelength of the laser beam can be easily selected from among the components of the reference beam as a reference in measurement of the wavelength of the laser beam.

20 Claims, 6 Drawing Sheets

LASER APPARATUS

BACKGROUND OF THE INVENTION

1. Field of the Invention

This invention generally concerns a laser apparatus, in particular, such a laser apparatus that has a function to measure an oscillated wavelength of a laser beam output from a laser oscillator by using as a reference a component, which has a wavelength near to the oscillated wavelength of the laser beam, selected from among components of a reference beam having spectral distribution which is already known.

2. Description of a Related Art

At an exposure process in producing a semiconductor device, a micro-fabrication of pattern to be transcribed to the resist coated on a substrate is going on, and improvement of definition of an exposure system is demanded. On this account, as a light source of the exposure system, a laser apparatus for outputting a narrow-banded laser beam attracts attention. In such a laser apparatus, a laser oscillator needs to be controlled so that an oscillated wavelength of a laser beam is measured and is kept at a desired value.

Japanese patent publication JP-A-5-95154 discloses a laser apparatus for outputting an atomic fluorine laser beam and a narrow-banded molecular fluorine laser beam and having a function to measure an oscillated wavelength of the molecular fluorine laser beam by using an oscillated wavelength of the atomic fluorine laser beam as a reference.

However, in this laser apparatus, the oscillated wavelength of the atomic fluorine laser beam is in a visible range, and therefore, is different from the oscillated wavelength of the molecular fluorine laser beam. Accordingly, a narrow-banded oscillated wavelength of the molecular fluorine laser beam can not be measured with high precision. Thus a correct reference becomes necessary to measure a wavelength of a beam having a narrow spectral distribution such as a narrow-banded laser beam.

In the other hand, Japanese patent publications JP-B2-2631553 and JP-B2-2631569 disclose an apparatus including reference light source for outputting a reference beam that contains a component having a wavelength near to an oscillated wavelength of a laser beam. The reference beam is spectrum-separated by a spectroscope. The apparatus has a function to select a component, which has a wavelength near to the oscillated wavelength of the laser beam, from among components of the reference beam output from the spectroscope.

In a chamber of the reference light source, atoms and molecules are generally enclosed which emit a beam containing many wavelength components. When such a beam is input to a spectroscope, a lot of wavelength components are provided. In the same time, there may occur a phenomenon that a wavelength component of a beam belonging to a predetermined wavelength range happen to appear in the different wavelength range from the predetermined wavelength range (that is to say, "an overlapping") when the beam is separated by spectrum separation means having high resolving power (for example, by an etalon or an echelle grating). The overlapping rate is increased higher if resolving power of the spectrum separation means becomes higher.

In a laser apparatus for outputting a narrow-banded laser beam, in order to measure an oscillated wavelength of the laser beam more precisely, it is necessary to separate components of a reference beam output from a reference light source by using spectrum separation means having high resolving power and to select among the separated components a component, which has a wavelength near to the oscillated wavelength of the laser beam, as a measurement reference. However, in the laser apparatus in which the reference beam output from a reference light source is separated by one spectrum separation means, a lot of wavelength components of the separated reference beam happen to focus on a detector with being very close or overlapped. Therefore, it is difficult to select a component, which has a wavelength near to an oscillated wavelength of the laser beam, among the detected components of the reference beam.

SUMMARY OF THE INVENTION

The present invention has been accomplished under these circumstances. An object of the present invention is to provide an laser apparatus having a function to easily select a component having a wavelength near to an oscillated wavelength of a laser beam among components of a reference beam output from a reference light source as a reference in measurement of an oscillated wavelength of the laser beam.

In order to solve above problems, a laser apparatus according to the first aspect of the invention comprises a laser oscillator for outputting a laser beam; a reference light source for outputting a reference beam having a spectral distribution which is already known; first spectrum separation means for spectrum-separating the laser beam output from the laser oscillator and spectrum-separating the reference beam output from the reference light source; second spectrum separation means having a higher resolving power than that of the first spectrum separation means and for spectrum-separating a part of the laser beam and a part of the reference beam emitted from the first spectrum separation means; and a detecting device for detecting a part of the laser beam and a part of the reference beam emitted from the second spectrum separation means.

Also, a laser apparatus according to the second aspect of the invention comprises a laser oscillator for emitting a laser beam; a reference light source for outputting a reference beam having a spectral distribution which is already known; first spectrum separation means for spectrum-separating the laser beam output from the laser oscillator and spectrum-separating the reference beam output from the reference light source; second spectrum separation means having a lower resolving power than that of the first spectrum separation means and for spectrum-separating a part of the laser beam and a part of the reference beam emitted from the first spectrum separation means; and a detecting device for detecting a part of the laser beam and a part of the reference beam emitted from the second spectrum separation means.

Further, a laser apparatus according to the third aspect of the invention comprises a laser oscillator for outputting a laser beam; a reference light source for outputting a reference beam having a spectral distribution which is already known; first spectrum separation means for spectrum-separating the laser beam output from the laser oscillator and spectrum-separating the reference beam output from the reference light source; second spectrum separation means having a different resolving power from that of the first spectrum separation means and for spectrum-separating a part of the laser beam and a part of the reference beam emitted from the first spectrum separation means and for emitting the separated part of the laser beam and the separated part of the reference beam toward the first spectrum separation means; and a detecting device for detecting a part of the laser beam and a part of the reference beam emitted from one of the first spectrum separation means and the second spectrum separation means after the part of the laser beam and the part of the reference beam have shuttled a predetermined times between the first spectrum separation means and the second spectrum separation means.

According to the present invention, spectrum separation means with low resolving power removes a component, which has a wavelength greatly different from an oscillated wavelength of the laser beam, from the reference beam. In contrast, spectrum separation means with high-resolution power spectrum-separates the reference beam with high resolution. Each of these two kinds of spectrum separation process should be performed for the reference beam once at least. Hereby, the outbreak of "an overlapping" is effectively suppressed and a lot of separated wavelength components of the reference beam can be prevented from focusing with being very close or overlapped on the detector. Accordingly, a component having a wavelength near to an oscillated wavelength of the laser beam is easily selected in the reference beam and defined as a reference in measurement of an oscillated wavelength of the laser beam. Thus an oscillated wavelength of the laser beam can be measured with high precision by using the selected wavelength component as a reference.

DESCRIPTION OF THE PREFERRED EMBODIMENTS

Referring to attached drawings, the first to fifth embodiments of the present invention will be explained as follows.

Figure 1:
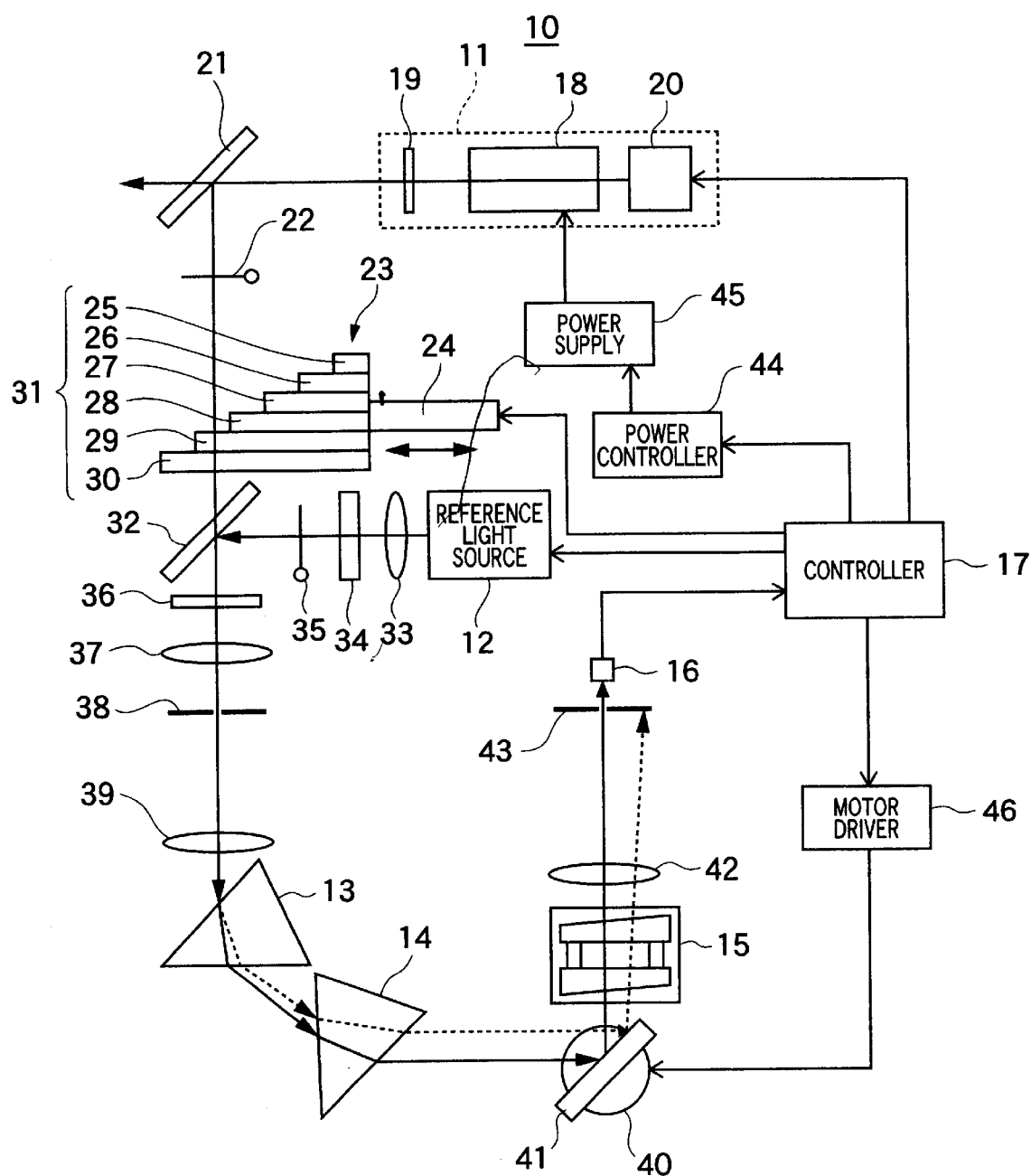
FIG. 1 shows whole constitution of a laser apparatus according to the first embodiment of the invention.

FIG. 1 shows whole constitution of a laser apparatus according to the first embodiment of the invention.

Laser apparatus 10 includes laser oscillator 11, reference light source 12, two prisms 13 and 14, etalon 15, line sensor 16, controller 17 and so on.

Laser oscillator 11 outputs a narrow-band laser beam. Laser oscillator 11 includes laser chamber 18, front mirror 19, narrow-band module 20 and so on. For example, as such a laser oscillator, $F_2$ laser attracts attention.

In laser chamber 18, two electrodes for electric discharge are arranged so as to face each other, and high-voltage power supply 45 supplies a high-voltage between two electrodes. In laser chamber 18, a laser medium (for example, molecular fluorine in case of $F_2$ laser) for generating a laser beam by the electric discharge is supplied.

Front mirror 19 is arranged on the left side of laser chamber 18. Front mirror 19 reflects a part of the laser beam and transmits the rest of it. Narrow-band module 20 is arranged on the right side of laser chamber 18. Narrow-band module 20 with front mirror 19 forms a resonance system for making resonance of the laser beam output from laser chamber 18 and amplifying it. Further, narrow-band module 20 makes the laser beam in amplification to have narrow band.

Beam splitter 21 is arranged on the left side of front mirror 19. Beam splitter 21 divides the laser beam output from laser oscillator 11 into two directions. Shutter 22 is arranged below beam splitter 21. Shutter 22 is controlled by controller 17. By closing shutter 22, the laser beam reflected downward by beam splitter 21 can be shaded.

Beam attenuator 23, which is slid-able from side to side, is arranged below shutter 22. Beam attenuator 23 includes slide piston 24 and light intensity adjustment member 31. Light intensity adjustment member 31 includes different sized plural pieces of ground glass 25–30 piled up like steps. Beam attenuator 23 corresponds to light intensity adjustment means for adjusting light intensity of the laser beam. Light intensity adjustment member 31 is attached to a point of slide piston 24. By operating slide piston 24 by controller 17, beam attenuator 23 is slid from side to side so that the number of ground glass through which the laser beam passes is changed. Therefore, light intensity of the laser beam arriving at line sensor 16 can be changed. Thus, light intensity of the laser beam input to line sensor 16 is adjusted to be most suitable.

Beam splitter 32 is arranged below beam attenuator 23, and reference light source 12 is arranged on the right side of beam splitter 32. Reference light source 12 outputs a reference beam having spectral distribution which is already known. In a chamber of reference light source 12, atoms and molecules (for example, bromine in case of $F_2$ laser) for emitting a beam including a component having a wavelength near to an oscillated wavelength of the laser beam are enclosed.

Between reference light source 12 and beam splitter 32, there are arranged lens 33, bandpass filter 34 and shutter 35 in turn from the right side. Lens 33 focuses the reference beam output from reference light source 12 toward bandpass filter 34. Bandpass filter 34 shades unnecessary components in a measurement of an oscillated wavelength of the laser beam among the reference beam output from reference light source 12. By bandpass filter 34, components having wavelengths which are different greatly from the oscillated wavelength of the laser beam can be removed coarsely among the reference beam that passed through lens 33. In addition, such a bandpass filter may be an interference filter for example.

Shutter 35 is controlled by controller 17. By closing shutter 35, the reference beam that passed through bandpass filter 34 can be shaded. Therefore, by opening one of shutters 22 and 35 and by closing the other, only one of the laser beam and the reference beam can be arrived at line sensor 16. When shutter 35 is opened, the reference beam that passed through bandpass filter 34 is divided into two directions by beam splitter 32. Beam splitter 32 also divides the laser beam that passed through beam attenuator 23 into two directions.

Ground glass 36 is arranged below beam splitter 32. Ground glass 36 scatters a part of the laser beam that passed through beam splitter 32 and the reference beam that was reflected by beam splitter 32. Lens 37 is arranged below ground glass 36. Lens 37 focuses downward a part of the laser beam and the reference beam scattered by ground glass 36. Thus, the whole laser beam is scattered uniformly, and the correct evaluation becomes possible.

Slit 38 is arranged below lens 37. Slit 38 makes a part of the laser beam and the reference beam focused by lens 37 pass through. Collimator lens 39 is arranged below slit 38. Collimator lens 39 collimates the laser beam and the reference beam that passed through slit 38.

Prism 13 is arranged below collimator lens 39, and prism 14 is arranged below prism 13. Prisms 13 and 14 form spectrum separation means for spectrum-separating the laser beam and the reference beam that passed through lens 39 with low resolution. Prisms 13 and 14 refract (a dashed line in FIG. 1) components having wavelengths, which are different greatly from an oscillated wavelength of the laser beam among reference beam that passed through collimator lens 39, more greatly than an optical path of the laser beam (a solid line in FIG. 1). Therefore, these components can be removed among the reference beam.

Rotatable stage 40 is arranged on the right side of prism 14, and mirror 41 is arranged on rotatable stage 40. Mirror 41 reflect upward a part of the laser beam and the reference beam that passed through prisms 13 and 14.

Etalon 15 is arranged above rotatable stage 40. Etalon 15 has higher resolving power than prisms 13 and 14. That is to say, etalon 15 corresponds to spectrum separation means for spectrum-separating a part of the laser beam and the reference beam reflected by mirror 41 with higher resolving power. Etalon 15 can spectrum-separate a part of the laser beam and reference beam that passed through prisms 13 and 14 into fine components.

Lens 42 is arranged above etalon 15. Lens 42 focuses upward a part of the laser beam and the reference beam that passed through etalon 15. Slit 43 is arranged below lens 42. Slit 43 makes a part of the laser beam and the reference beam focused by lens 42 pass through.

Line sensor 16 is arranged above slit 43. Line sensor 16 corresponds to a detector for detecting the laser beam and the reference beam. Line sensor 16 has a lot of channels arranged in one dimension. Each of these channels includes an element for receiving light (for example, photo diode) and outputs electrical signal according to received light intensity. Line sensor 16 detects the laser beam and the reference beam that passed through slit 43. The detected result of line sensor 16 is input to controller 17.

Controller 17 controls reference light source 12 and narrow-band module 20. Further, controller 17 controls high-voltage power supply 45 through power supply controller 44, and controls rotatable stage 40 through motor driver 46. Controler 17 memorizes, for example, spectral distribution of the reference beam output from reference light source 12, and measures the oscillated wavelength of the laser beam and the wavelength of the reference beam detected by line sensor 16 on the basis of the spectral distribution.

Next, an adjustment mode and a measurement mode in laser apparatus 10 will be explained.

The adjustment mode in laser apparatus 10 is carried out as follows:
(1) By controlling narrow-band module 20, the laser beam output from laser oscillator 11 is adjusted to the maximum output.
(2) By controlling rotatable stage 40, the direction of mirror 41 is adjusted so that the laser beam that passed through two prisms 13 and 14 and etalon 15 is detected by line sensor 16.
(3) By turning on reference light source 12, the reference beam is output from reference light source 12. And then, by controlling rotatable stage 40, the direction of mirror 41 is made a fine adjustment so that a part of the reference beam that passed through two prisms 13 and 14 and etalon 15 is detected by line sensor 16.
(4) Thus, only a component having a wavelength near to the oscillated wavelength of the laser beam among the reference beam passes through slit 43 and arrives at line sensor 16. And then, from line sensor 16, the detected result representing only a component having a wavelength near to the oscillated wavelength of the laser beam among the reference beam is output.

The measurement mode in laser apparatus 10 is carried out as follows:
(1) By turning off reference light source 12 or by making beam attenuator 23 slide from side to side, light intensity of the laser beam arriving at line sensor 16 is adjusted to be most suitable. Alternatively, by making beam attenuator 23 slide from side to side on the basis of power of the laser beam output from laser oscillator 11, light intensity of the laser beam arriving at line sensor 16 is adjusted to be most suitable.
(2) Next, line sensor 16 detects the laser beam and the reference beam that passed through two prisms 13 and 14 and etalon 15. After that, a component having a wavelength near to an oscillated wavelength of the detected laser beam is selected as a reference in measuring the wavelength of the laser beam among the detected reference beam.
(3) Further, the oscillated wavelength of the detected laser beam is measured on the basis of the reference. After that, quantity of deviation between the measured value and the desired value is estimated, and narrow-band module 20 is controlled in accordance with the estimated quantity of deviation.

According to this embodiment, components having wavelengths which are different greatly from an oscillated wavelength of a laser beam are removed among a reference beam by prisms 13 and 14. And a part of the reference beam is spectrum-separated finely by etalon 15. On this account, the outbreak rate of "an overlapping" is effectively suppressed and a lot of wavelength components of the separated reference beam can be prevented from focusing on line sensor 16 with being very close or overlapped. Accordingly a component having a wavelength near to an oscillated wavelength of the laser can be easily selected as a reference among the reference beam and the oscillated wavelength of the laser beam can be measured on the basis of the reference with higher precision.

In this embodiment, by controlling rotatable stage 40 so that the laser beam can be detected by line sensor 16, an optical path of the laser beam and the reference beam is adjusted. Thus, only a component having a wavelength near to an oscillated wavelength of the laser beam is selected by slit 43 among the reference beam spectrum-separated by etalon 15.

Figure 2:
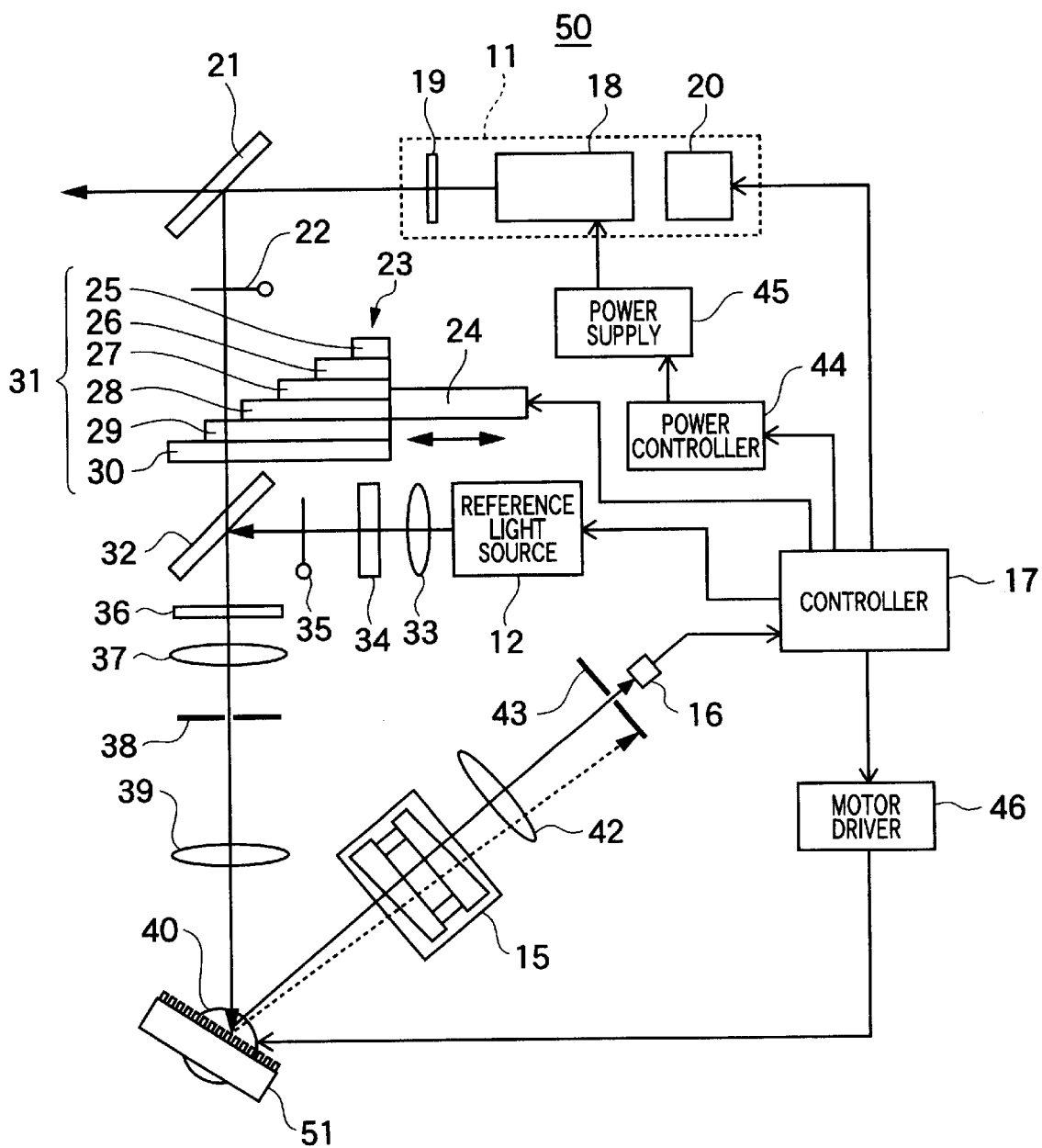
FIG. 2 shows whole constitution of a laser apparatus according to the second embodiment of the invention.

FIG. 2 shows whole constitution of a laser apparatus according to the second embodiment of the invention. As the common elements refer the same reference numeral in FIG. 1, the explanation of these elements will be omitted.

Laser apparatus 50 includes diffraction grating 51 instead of prisms 13 and 14. Diffraction grating 51 is arranged on rotatable stage 40 and equivalent to spectrum separation means for spectrum-separating a laser beam and a reference beam that passed through collimator lens 39 with low resolving power. Diffraction grating 51 diffracts (a dashed line in FIG. 2) components having wavelengths, which are different greatly from an oscillated wavelength of the laser beam among the reference beam that passed through collimator lens 39, more greatly than an optical path of the laser beam (a solid line in FIG. 2). Therefore, these components can be removed among the reference beam.

According to this embodiment, components having wavelengths which are different greatly from an oscillated wavelength of a laser beam are removed among the reference beam by diffraction grating 51. A part of the reference beam is spectrum-separated finely by etalon 15. Generally, resolving power of a diffraction grating is higher than a prism, and lower than an etalon. Accordingly, if plural spectral lines of the reference beam output from reference light source 12 are close to each other, the same effect as the first embodiment can be achieved.

Figure 3:
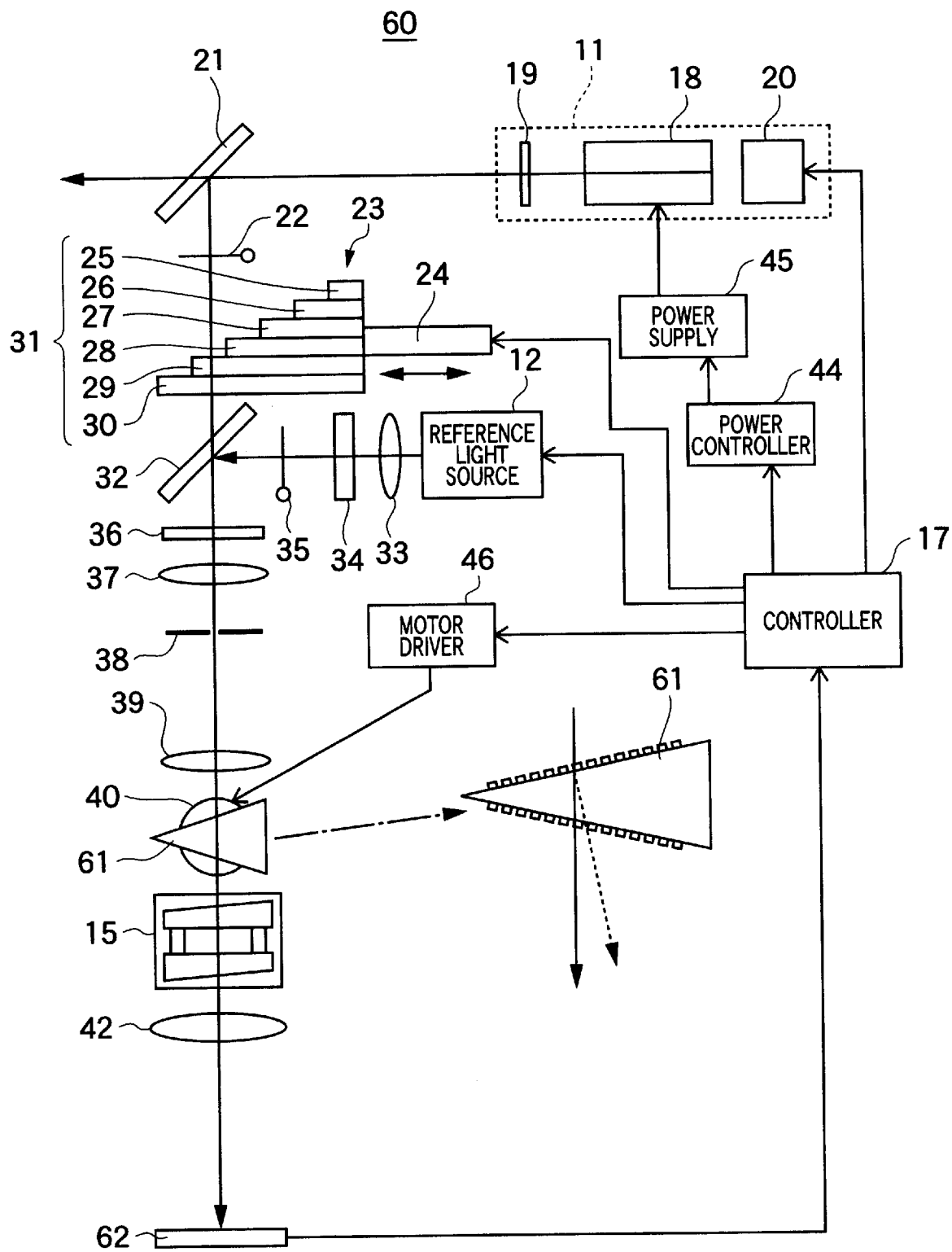
FIG. 3 shows whole constitution of a laser apparatus according to the third embodiment of the invention.

FIG. 3 shows whole constitution of a laser apparatus according to the third embodiment of the invention.

Laser apparatus 60 includes a grism instead of prisms 13 and 14. The grism is a kind of a transmission grating and in which a grating is formed on two surfaces of a prism.

Grism 61 is arranged on rotatable stage 40, and it corresponds to spectrum separation means for spectrum-separating a laser beam and a reference beam that passed through collimator lens 39 with low resolving power. Grism 61 diffracts (a dashed line in FIG. 3) components having wavelengths, which are different greatly from an oscillated wavelength of the laser beam among the reference beam that passed through collimator lens 39, more greatly than an optical path of the laser beam (a solid line in FIG. 3). Therefore, these components can be removed among the reference beam. In addition, a grism in which a grating is formed on one surface may be also used.

Laser apparatus 60 includes area sensor 62 instead of line sensor 16. Area sensor 62 has a lot of channels arranged in two dimensions, and it corresponds to a detector for detecting the laser beam and the reference beam.

According to this embodiment, components having wavelengths which are different greatly from an oscillated wavelength of a laser beam are removed among a reference beam by grism 61. And a part of the reference beam is spectrum-separated finely by etalon 15. On this account, the outbreak rate of "an overlapping" is effectively suppressed and a lot of wavelength components of the separated reference beam can be prevented from focusing on area sensor 62 with being very close or overlapped. Accordingly one or more component having wavelength near to an oscillated wavelength of the laser can be easily selected as references among the reference beam easily and the oscillated wavelength of the laser beam can be measured on the basis of the references with higher precision.

Figure 4A:
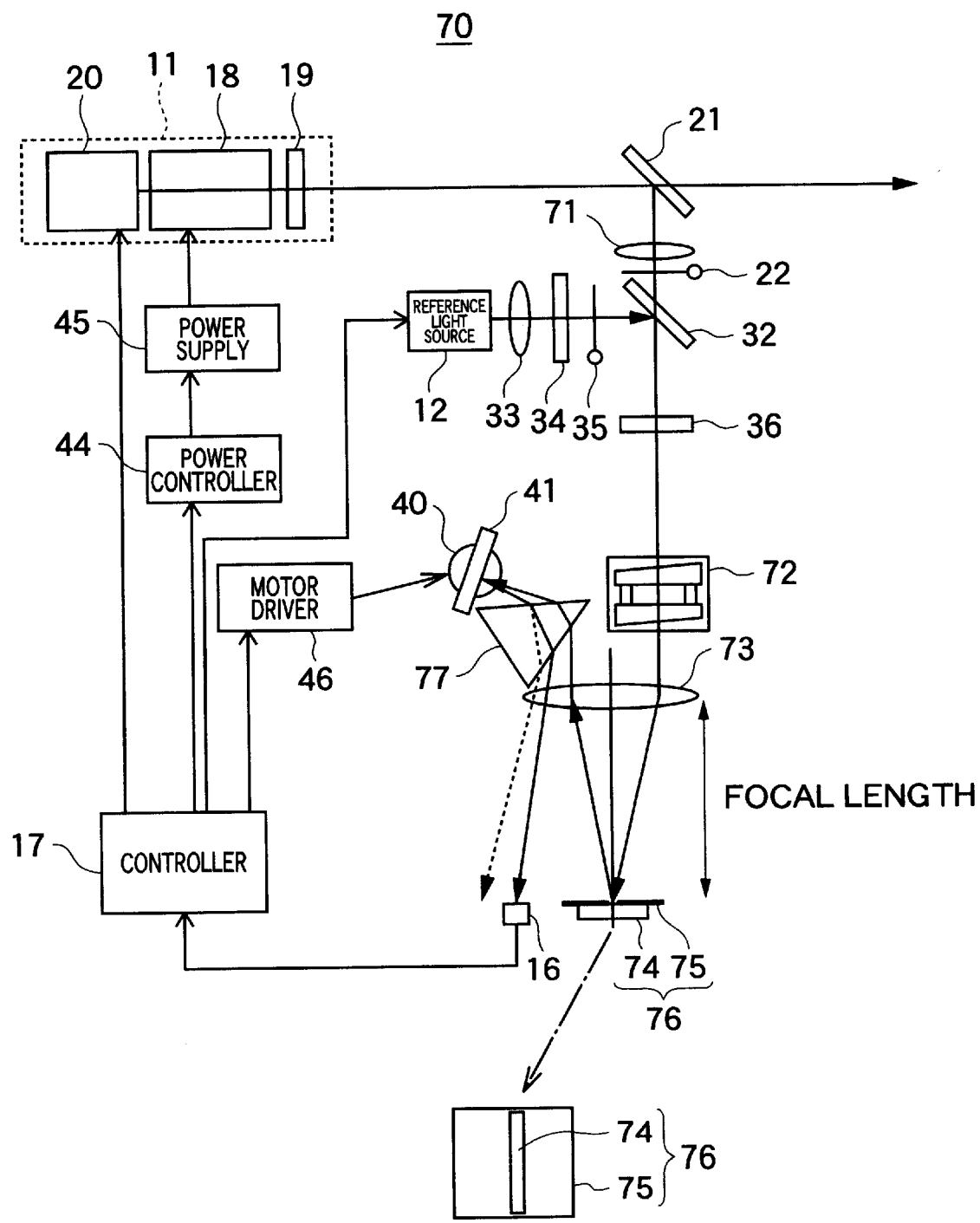
FIGS. 4A and 4B show whole constitution of a laser apparatus according to the fourth embodiment of the invention.
Figure 4B:
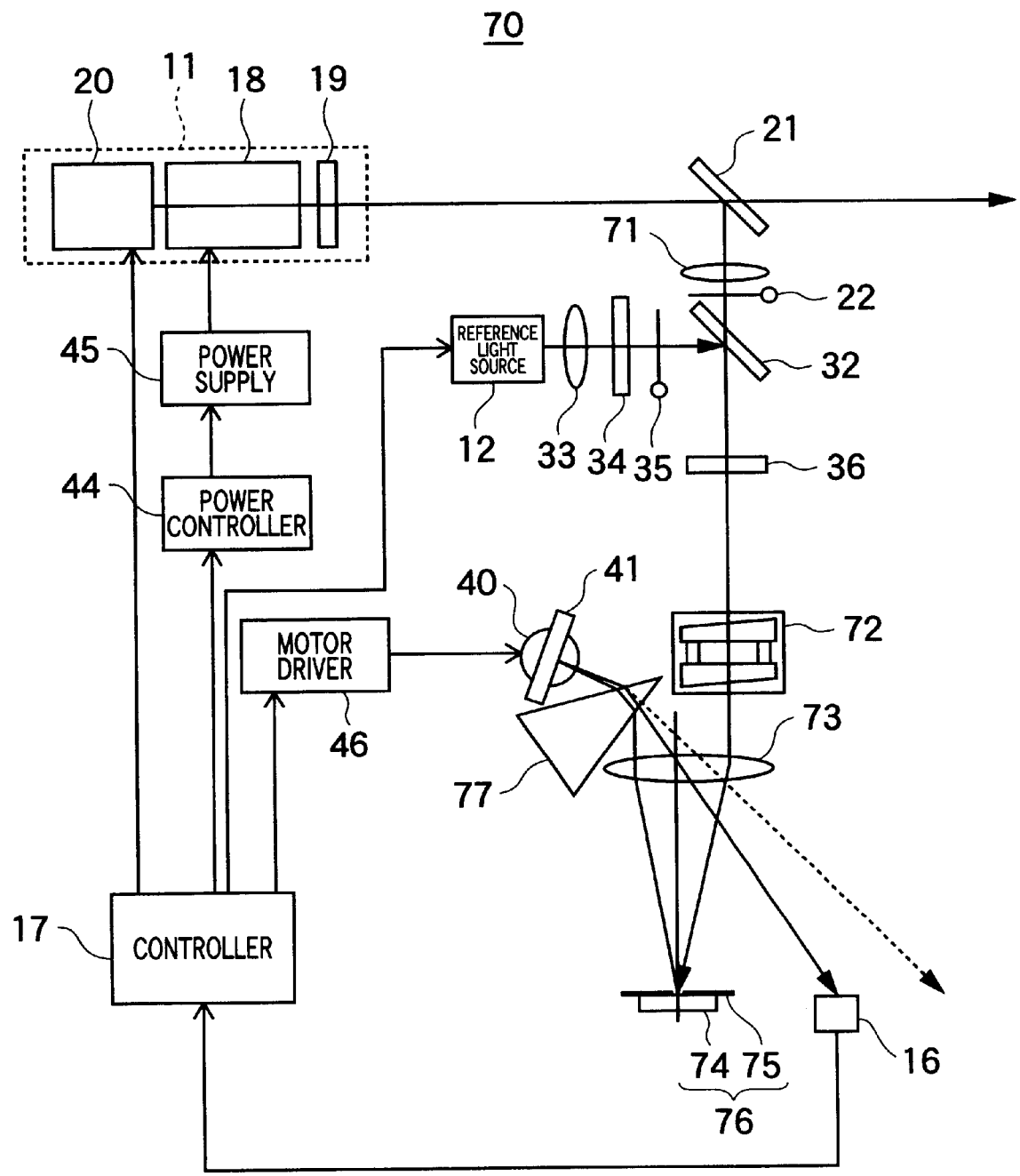

FIGS. 4A and 4B show whole constitution of a laser apparatus according to the fourth embodiment of the invention.

In laser apparatus 70, lens 71 is arranged below beam splitter 21. Lens 71 focuses a laser beam reflected downward by beam splitter 21 toward the same direction. Below lens 71, in turn from the upper side, shutter 22, beam splitter 32, ground glass 36 are arranged, and etalon 72 is arranged below ground glass 36.

Etalon 72 corresponds to spectrum separation means for spectrum-separating a part of a laser beam and a reference beam that passed through ground glass 36 with high resolving power. Etalon 72 spectrum-separates the laser beam and the reference beam that passed through ground glass 36 into fine components. Lens 73 is arranged below etalon 72. Lens 73 focuses downward a part of the laser beam and the reference beam that passed through etalon 72.

Below lens 73, optical element 76 including mirror 74 and slit 75 is arranged at a focal point of lens 73. Mirror 74 is put on one surface of slit 75. On optical element 76, the laser beam and the reference beam that passed through lens 73 form an interference fringe. In the interference fringe formed by the reference beam that passed through lens 73, a lot of wavelength components are mixed. Mirror 74 reflects upward a part of the interference fringe formed on optical element 76.

On the left side of etalon 72, prism 77, which corresponds to spectrum separation means for spectrum-separating a part of the laser beam and the reference beam that were spectrum-separated by etalon 72 with low resolving power, is arranged. Prism 77 refracts (a dashed line in FIGS. 4A and 4B) components having wavelengths, which are different greatly from an oscillated wavelength of the laser beam among the reference beam that passed through etalon 72 and lens 73, more greatly than an optical path of the laser beam (a solid line in FIGS. 4A and 4B). Therefore, these components can be removed among the reference beam.

Rotatable stage 40 is arranged above prism 77, and mirror 41 is arranged on rotatable stage 40. Mirror 41 reflects toward prism 77 a part of the laser beam and the reference beam that passed through prism 77.

On the left side of optical element 76, line sensor 16 is arranged at a position where line sensor 16 never detects the interference fringe formed on optical element 76 by mistake. In addition, line sensor 16 is arranged in a different position in FIG. 4B.

According to this embodiment, the reference beam is spectrum-separated by etalon 72 into detailed wavelength components. And wavelength components having wavelengths which are different greatly from an oscillated wavelength of a laser beam are removed among a part of the reference beam by prism 77. A part of the reference beam is spectrum-separated finely by etalon 15. Accordingly, the same effect as the first embodiment can be achieved. In addition, laser apparatus 70 is compacted by using lens 73 in common in this embodiment.

Figure 5:
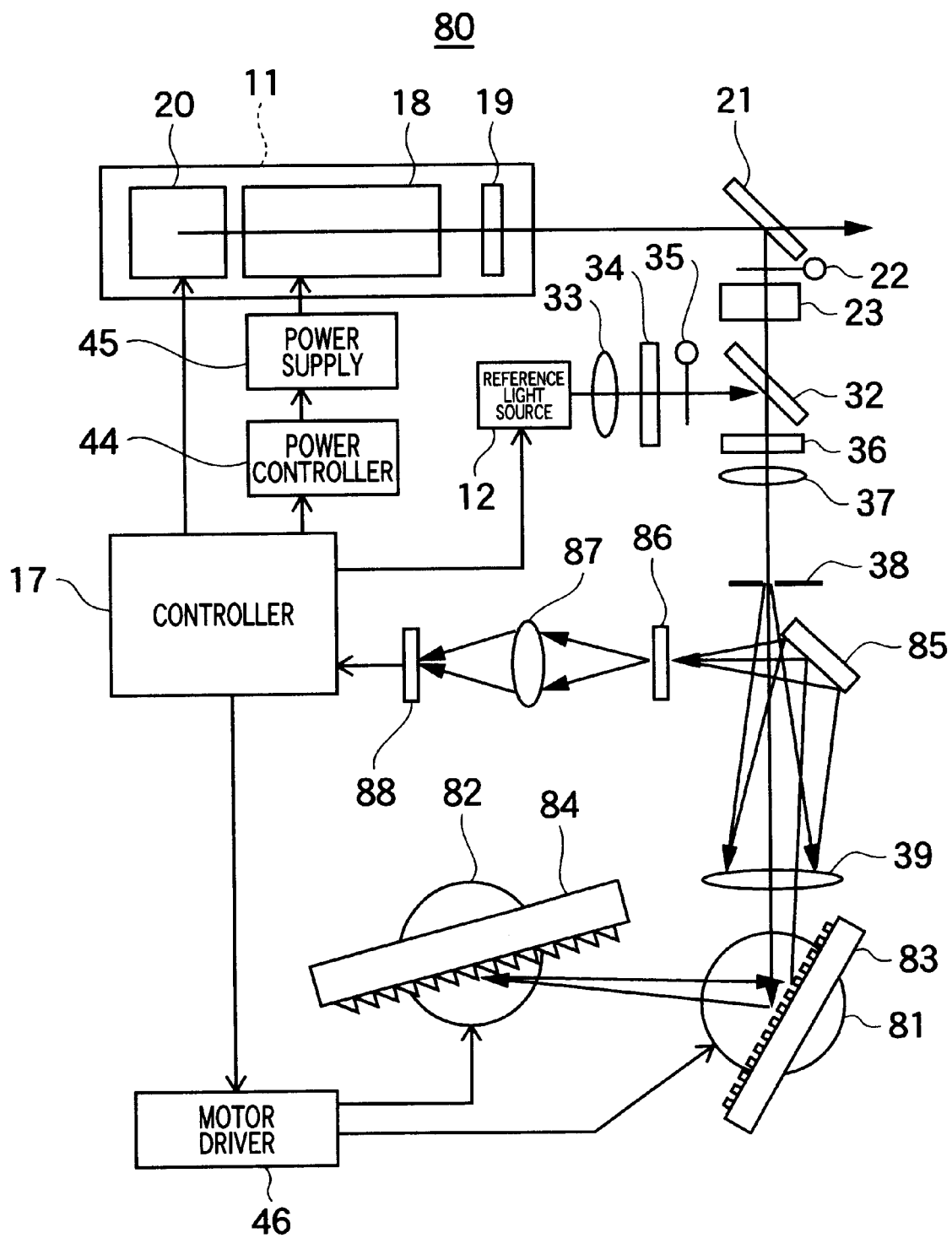
FIG. 5 shows whole constitution of a laser apparatus according to the fifth embodiment of the invention.

FIG. 5 shows whole constitution of a laser apparatus according to the fifth embodiment of the invention.

In laser apparatus 80, rotatable stage 81 is arranged below collimator lens 39, and holographic grating 83 is arranged on rotatable stage 81. Holographic grating 83 corresponds to spectrum separation means for spectrum-separating a laser beam and a reference beam that passed through collimator lens 39 with low resolving power. Holographic grating 83 diffracts (a dashed line in FIG. 5) components having wavelengths, which are different greatly from an oscillated wavelength of the laser beam among the reference beam that passed through collimator lens 39, more greatly than an optical path of the laser beam (a solid line in FIG. 5). Therefore, these components can be removed among the reference beam.

Rotatable stage 82 is arranged on the left side of rotatable stage 81, and echelle grating 84 is arranged on rotatable stage 82. Echelle grating 84 spectrum-separates a part of the laser beam and the reference beam that were emitted from holographic grating 83 with a high resolving power. That is to say, echelle grating 84 corresponds to spectrum separation means that diffracts a part of the laser beam and the reference beam that were spectrum-separated toward holographic grating 83. Echelle grating 84 can spectrum-separate a part of the laser beam and the reference beam that were emitted from holographic grating 83 into more detailed wavelength components.

Between slit 38 and collimator lens 39, mirror 85 is arranged away from an optical axis. Mirror 85 reflects toward the left direction the laser beam and the reference beam that went and returned between holographic grating 83 and echelle grating 84 predetermined times.

On the left side of mirror 85, fluorescent screen 86 for converting a predetermined beam (for example, ultraviolet light) into visible light is arranged. Fluorescent screen 86 converts the laser beam and the reference beam reflected by mirror 85 into visible light. On the left side of fluorescent screen 86, magnifier 87 is arranged for magnifying visible light output from fluorescent screen 86. On the left side of magnifier 87, line sensor 88 is arranged for detecting visible light that passed through magnifier 87. Line sensor 88 corresponds to a detector for indirectly detecting the laser beam and the reference beam through visible light. Line sensor 88 has a lot of channels arranged in one dimension. Line sensor 88 detects the laser beam and the reference beam that passed through magnifier 88. The detected result of line sensor 88 is input to controller 89.

Controller 89 controls reference light source 12 and narrow-band module 20. And controller 89 controls high-voltage power supply 45 through power supply controller 44, and controls rotatable stages 81 and 82 through motor driver 46. Controller 89, for example, memorizes a spectral distribution of the reference beam output from reference light source 12, and measures the oscillated wavelength of the laser beam and the wavelength of the reference beam that detected by line sensor 88 on the basis of the spectral distribution.

Next, an adjustment mode and a measurement mode in laser apparatus 80 will be explained.

The adjustment mode in laser apparatus 80 is carried out as follows:
(1) By controlling narrow-band module 20, the laser beam output from laser oscillator 11 is adjusted to the maximum output.
(2) By controlling rotatable stage 81, the direction of holographic grating 83 is adjusted so that the second order laser beam diffracted by holographic grating 83 is detected by line sensor 88. At this time, by offsetting holographic grating 83 by predetermined angle from a present position, and it is set in a desired angle.
(3) By controlling rotatable stage 82, the direction of escelle grating 84 is adjusted so that the desired ordered laser beam that was diffracted by escelle grating 84 is detected by line sensor 88. At this time, escelle grating 84 is set at almost 90 degrees from an optical axis.
(4) By turning on reference light source 12, the reference beam is output from reference light source 12. And then, by controlling rotatable stages 81 and 82, the directions of holographic grating 83 and escelle grating 84 are finely adjusted so that a part of the reference beam that went and returned between holographic grating 83 and escelle grating 84 predetermined times is detected by line sensor 88.
(5) Thus, only a component having a wavelength near to the oscillated wavelength of the laser beam among the reference beam arrives at line sensor 88. And then, from line sensor 88, the detected result representing only the component having a wavelength near to the oscillated wavelength of the laser beam among the reference beam is output.

The measurement mode in laser apparatus 80 is carried out as follows:
(1) By turning off reference light source 12 or by sliding beam attenuator 23 from side to side, light intensity of the laser beam arriving at line sensor 88 is adjusted to be most suitable. In addition, by sliding beam attenuator 23 from side to side on the basis of output of the laser output from laser oscillator 11, light intensity of the laser beam arriving at line sensor 88 can be adjusted to be most suitable.
(2) Next, line sensor 88 detects the laser beam and the reference beam that went and returned between holographic grating 83 and echelle grating 84 predetermined times. After that, a component having a wavelength near to an oscillated wavelength of the detected laser beam is selected as a reference in measuring the wavelength of the laser beam among the detected reference beam.
(3) The oscillated wavelength of the detected laser beam is measured on the basis of the reference. After that, quantity of deviation between the measured value and the desired value is estimated, and narrow-band module 20 is controlled on the basis of the estimated quantity of deviation.
(4) In addition, if measuring spectral line width of the laser beam output from laser oscillator 11, either rotatable stage 81 or 82 may be controlled so that the laser beam diffracted by eschelle grating 84 two times or more is detected by line sensor 88.
(5) If measuring the laser beam and the reference beam over wide wavelength range, either rotatable stage 81 or 82 may be controlled so that the second order laser beam or the reference beam that was diffracted by holographic grating 83 (and that was not diffracted by eschelle grating 84) or the laser beam or the reference beam that was once diffracted by eschelle grating 84 is detected by line sensor 88.
(6) If measuring the laser beam and the reference beam over narrow wavelength range precisely, either rotatable stage 81 or 82 may be controlled so that the laser beam or the reference beam that was diffracted by eschelle grating 84 several times is detected by line sensor 88.

According to this embodiment, components having wavelengths which are different greatly from an oscillated wavelength of a laser beam are removed among a reference beam whenever holographic grating 83 diffracts the reference beam. A part of the reference beam is spectrum-separated finely whenever echelle grating 84 diffracts the reference beam. Accordingly a component having a wavelength near to an oscillated wavelength of the laser can be easily selected as a reference among the reference beam and the oscillated wavelength of the laser beam can be measured on the basis of the reference with higher precision.

What is claimed is:

1. A laser apparatus, comprising:
   a laser oscillator that outputs a laser beam;
   a reference light source that outputs a reference beam having a spectral distribution which at least partially overlaps a spectral distribution of the laser beam and which is already known;
   first spectrum separation means, arranged to receive the laser beam output from said laser oscillator and the reference beam output from said reference light source, for spectrum-separating the laser beam output from said laser oscillator and spectrum-separating the reference beam output from said reference light source;
   second spectrum separation means, arranged to receive at least a part of the laser beam output from said laser oscillator and at least a part of the reference beam output from said first spectrum separation means and having a higher resolving power than that of said first spectrum separation means, for further spectrum-separating both said at least a part of the laser beam and said at least a part of the reference beam; and
   a detector that detects a characteristic of the laser beam and the reference beam received from said second spectrum separation means.

2. A laser apparatus according to claim 1, wherein said characteristic comprises spectral components and said apparatus further comprises control means for controlling said laser oscillator so as to keep the wavelength of a spectral component of the laser beam within a prescribed range, in accordance with a wavelength of the detected laser beam obtained by using a selected one of said spectral components of the reference beam detected by said detector.

3. A laser apparatus according to claim 2, further comprising optical path adjusting means for adjusting optical paths from said laser oscillator and said reference light source to said detector, and wherein said control means controls said optical path adjusting means so that the laser beam output from said laser oscillator reaches said detector.

4. A laser apparatus according to claim 1, further comprising a filter means for filtering the reference beam output from said reference light source.

5. A laser apparatus according to claim 1, further comprising a light intensity adjusting means for controlling light intensity of the laser beam which reaches said detector.

6. A laser apparatus according to claim 1, further comprising a first shutter means for selectively blocking the laser beam from reaching said detector when only the reference beam is to be detected and a second shutter means for selectively blocking the reference beam from reaching said detector when only the laser beam is to be detected.

7. A laser apparatus according to claim 1, wherein said laser oscillator comprises:
- a laser chamber, having a laser medium supplied therein, that outputs the laser beam head pump;
- a front mirror that is arranged on one side of said laser chamber and that reflects a portion of the laser beam, which portion has less strength than a predetermined value, and transmits a second portion of the laser beam, which second portion has strength greater than or equal to the predetermined value; and
- a narrow-band module that is arranged on the other side of said laser chamber and that forms with said front mirror a resonance system that amplifies the laser beam having a specific wavelength range.

8. A laser apparatus, comprising:
- a laser oscillator that outputs a laser beam;
- a reference light source that outputs a reference beam having a spectral distribution which at least partially overlaps a spectral distribution of the laser beam and which is already known;
- first spectrum separation means, arranged to receive the laser beam output from said laser oscillator and the reference beam output from said reference light source, for spectrum-separating the laser beam output from said laser oscillator and spectrum-separating the reference beam output from said reference light source;
- second spectrum separation means, arranged to receive at least a part of the laser beam output from said laser oscillator and at least a part of the reference beam output from said first spectrum separation means and having a lower resolving power than that of said first spectrum separation means, for further spectrum-separating both said at least a part of the laser beam and said at least a part of the reference beam; and
- a detector that detects a characteristic of the laser beam and the reference beam received from said second spectrum separation means.

9. A laser apparatus according to claim 8, wherein said characteristic comprises spectral components and said apparatus further comprises control means for controlling said laser oscillator so as to keep the wavelength of a spectral component of the laser beam within a prescribed range, in accordance with a wavelength of the detected laser beam obtained by using a selected one of said spectral components of the reference beam detected by said detector.

10. A laser apparatus according to claim 8, further comprising optical path adjusting means for adjusting optical paths from said laser oscillator and said reference light source to said detector, and wherein said control means controls said optical path adjusting means so that the laser beam output from said laser oscillator reaches said detector.

11. A laser apparatus according to claim 8, further comprising a filter means for filtering the reference beam output from said reference light source.

12. A laser apparatus according to claim 8, further comprising a light intensity adjusting means for controlling light intensity of the laser beam which reaches said detector.

13. A laser apparatus according to claim 8, further comprising a first shutter means for selectively blocking the laser beam from reaching said detector when only the reference beam is to be detected and a second shutter means for selectively blocking the reference beam from reaching said detector when only the laser beam is to be detected.

14. A laser apparatus according to claim 8, wherein said laser oscillator comprises:
- a laser chamber, having a laser medium supplied therein, that outputs the laser beam;
- a front mirror that is arranged on one side of said laser chamber and that reflects a portion of the laser beam, which portion has less strength than a predetermined value, and transmits a second portion of the laser beam, which second portion has strength greater than or equal to the predetermined value; and
- a narrow-band module that is arranged on the other side of said laser chamber and that forms with said front mirror a resonance system that amplifies the laser beam having a specific wavelength range.

15. A laser apparatus, comprising:
- a laser oscillator that outputs a laser beam;
- a reference light source that outputs a reference beam having a spectral distribution which at least partially overlaps a spectral distribution of the laser beam and which is already known;
- first spectrum separation means, arranged to receive the laser beam output from said laser oscillator and the reference beam output from said reference light source, for spectrum-separating the laser beam output from said laser oscillator and spectrum-separating the reference beam output from said reference light source;
- second spectrum separation means, arranged to receive at least a part of the laser beam output from said laser oscillator and at least a part of the reference beam output from said first spectrum separation means and having a different resolving power than that of said first spectrum separation means, for further spectrum-separating both said at least a part of the laser beam and said at least a part of the reference beam to output a separated part of the laser beam and a separated part of the reference beam toward said first spectrum separation means; and
- a detector that is arranged to receive at least a part of the laser beam and at least a part of the reference beam output from one of said first spectrum separation means and said second spectrum separation means after the at least part of the laser beam and the at least part of the reference beam have shuttled a predetermined number of times between said first spectrum separation means and said second spectrum separation means and that detects a characteristic of the laser beam in connection with a characteristic of the reference beam.

16. A laser apparatus according to claim 15, wherein said characteristic comprises spectral components and said apparatus further comprises control means for controlling said laser oscillator so as to keep the wavelength of a spectral component of the laser beam within a prescribed range, in accordance with a wavelength of the detected laser beam obtained by using a selected one of said spectral components of the reference beam detected by said detector.

17. A laser apparatus according to claim 16, further comprising:

optical path adjusting means for adjusting optical paths from said laser oscillator and said reference light source to said detector, wherein said control means controls said optical path adjusting means so that the laser beam output from said laser oscillator reaches said detector.

18. A laser apparatus according to claim 15, further comprising a filter means for filtering the reference beam output from said reference light source.

19. A laser apparatus according to claim 15, further comprising a first shutter means for selectively blocking the laser beam from reaching said detector when only the reference beam is to be detected and a second shutter means for selectively blocking the reference beam from reaching said detector when only the laser beam is to be detected.

20. A laser apparatus according to claim 15, wherein said laser oscillator comprises:

a laser chamber, having a laser medium supplied therein, that outputs the laser beam;

a front mirror that is arranged on one side of said laser chamber that reflects a portion of the laser beam, which portion has less strength than a predetermined value, and that transmits a second portion of the laser beam, which second portion has strength greater than or equal to the predetermined value; and a narrow-band module that is arranged on the other side of said laser chamber and that forms with said front mirror a resonance system that amplifies the laser beam having a specific wavelength range.

* * * * *